July 1, 1958 T. DAWKINS 2,841,658

LOCKING DEVICE FOR DIAL TELEPHONES

Filed Feb. 24, 1954 3 Sheets-Sheet 1

INVENTOR.
THOMAS DAWKINS
BY
ATTORNEY

July 1, 1958 T. DAWKINS 2,841,658

LOCKING DEVICE FOR DIAL TELEPHONES

Filed Feb. 24, 1954 3 Sheets-Sheet 2

INVENTOR.
THOMAS DAWKINS
BY
[signature]
ATTORNEY

July 1, 1958 T. DAWKINS 2,841,658

LOCKING DEVICE FOR DIAL TELEPHONES

Filed Feb. 24, 1954 3 Sheets-Sheet 3

INVENTOR.
THOMAS DAWKINS
BY
Zoltan Polachek
ATTORNEY

United States Patent Office 2,841,658
Patented July 1, 1958

2,841,658

LOCKING DEVICE FOR DIAL TELEPHONES

Thomas Dawkins, New York, N. Y.

Application February 24, 1954, Serial No. 412,223
5 Claims. (Cl. 179—189)

This invention relates to new and useful improvements in locking devices for dial telephones.

More particularly, the present invention proposes the construction of an improved locking cap which can quickly and easily be put over a telephone dial and secured to limit the telephone to incoming calls and to prevent unauthorized dialing of outgoing calls.

As another object, the present invention proposes forming the locking cap as a single piece of molded metal so that it can be produced rapidly and inexpensively.

Still further, the present invention proposes constructing the locking cap so that it can be used with an ordinary padlock having the usual bow or shackle.

Another object of the invention proposes constructing the locking cap as a small, compact segmental piece having its own key operated lock built therein and with no readily visible indication of how the cap is attached to the dial once it is on a telephone dial.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
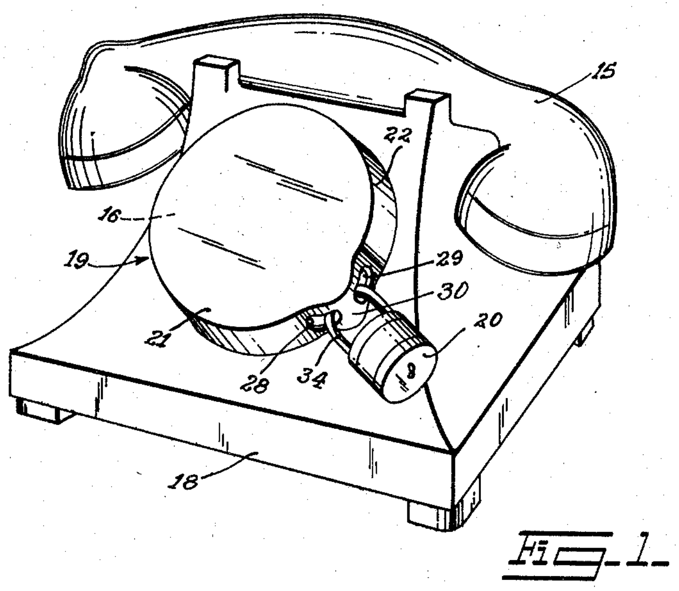
Fig. 1 is a perspective view of a dial telephone equipped with a locking device constructed and arranged in accordance with the present invention.
Figure 2:
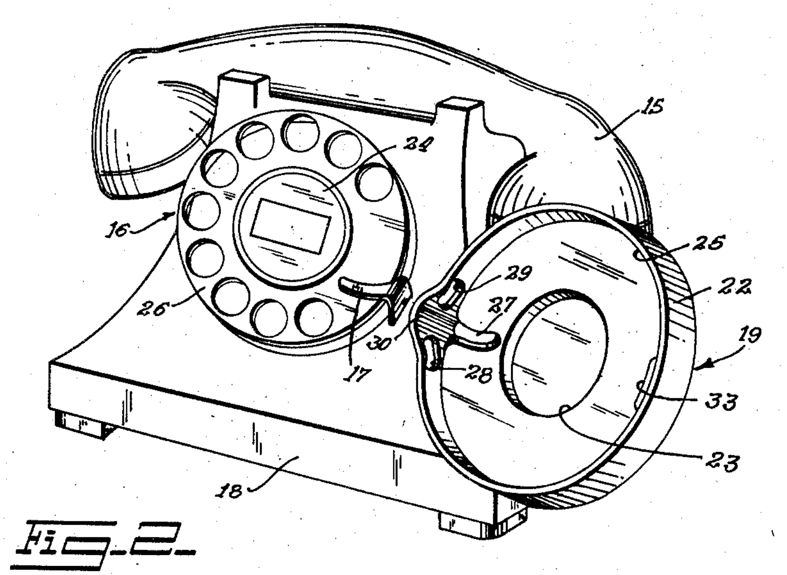
Fig. 2 is a view similar to Fig. 1 but showing the locking cap removed.
Figure 3:
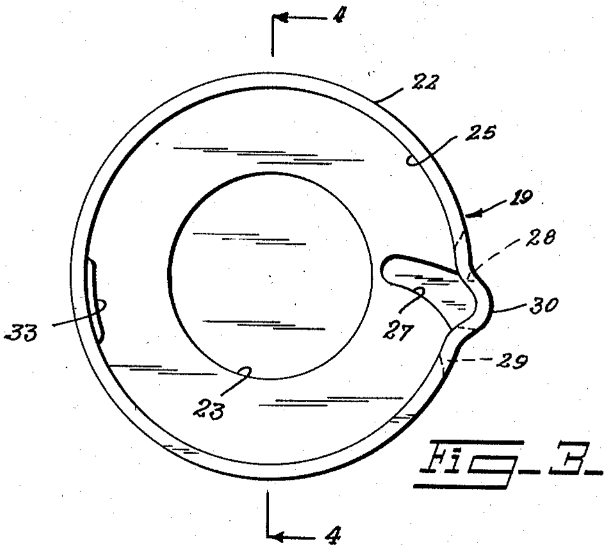
Fig. 3 is a bottom plan view of the locking cap shown in Figs. 1 and 2.
Figure 4:
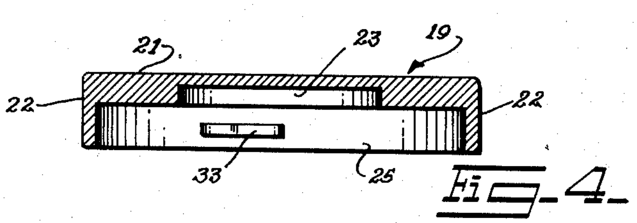
Fig. 4 is a sectional view taken on line 4—4 of Fig. 3.
Figure 6:
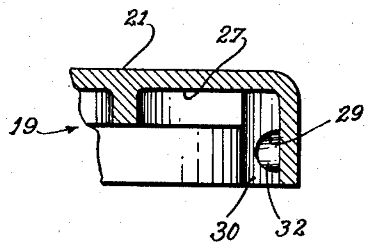
Fig. 6 is a fragmentary sectional view taken on line 6—6 of Fig. 5.

Referring more particularly to the drawings, the locking device as indicated in Figs. 1 and 2, is for a standard desk telephone 15 having a rotary dial 16 (Fig. 2) with a fixed finger stop 17 associated therewith and secured to the base 18 of the telephone.

The device consists of a cap 19, preferably of metal molded or fabricated, which fits over the dial 16 and finger stop 17 and is secured by a padlock 20.

Cap 19 has a top 21 and sides 22. Inside the cap 19 is an inner cavity 23 adapted to seat or fit over the central portion 24 of the telephone dial 16 and a shallower inner cavity 25 adapted to seat or fit over the outer portion 26 of the dial 16.

Cap 19 also has provided inside it an inner recess 27 of a depth and conformation to seat or fit over the fixed finger stop 17 on a telephone. The cavities 23 and 25 preferably are molded so that they are one inner cavity in the cap.

The sides 22 of the cap 19 have formed in them and extending through them a pair of spaced lock openings 28 and 29 which are disposed on either side of a boss 30 which houses the finger stop 17 when the cap 19 is over the dial 16. In this manner, the openings 28 and 29 will be disposed one on each side of the fixed finger stop 17 when the cap is over the dial 16. The openings 28 and 29 are disposed on the cap so that they will lie under the dial 16 when the cap 19 is over the dial.

Figure 5:
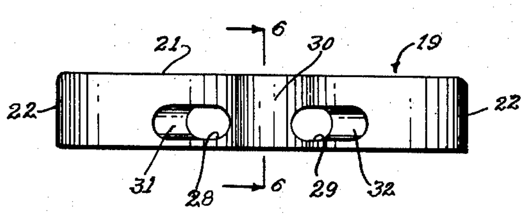
Fig. 5 is an elevational view of the locking cap.
Figure 7:
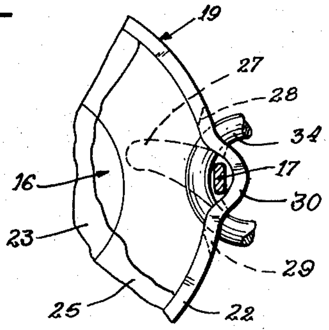
Fig. 7 is a fragmentary bottom view of the telephone dial shown in Fig. 2 as covered by the locking cap as shown in Fig. 1, the shackle of the lock also being broken away and in section.
Figure 8:
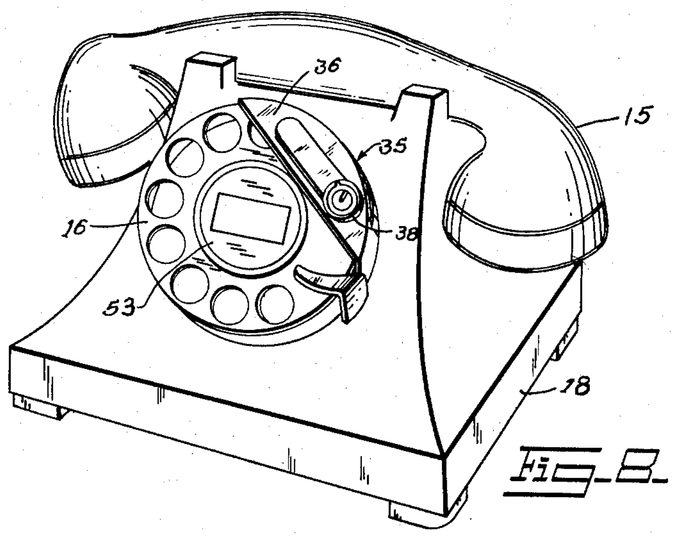
Fig. 8 is a view similar to Fig. 1 but illustrating a modification of the present invention.

Sides 22 have inwardly sloping entrance grooves 31 and 32 (Fig. 5) disposed on the outside of the cap adjacent the lock openings 28 and 29, respectively. A lug 33 is formed on the sides 22 of the cap 19 inside the cap. Lug 33 is disposed so as removably to fit under the dial 16 and is located generally across from the lock openings 28 and 29.

Padlock 20 has the usual shackle or bow 34 and the lock openings 28 and 29 are of a size closely to receive the shackle. The shackle 34 preferably is of a size closely and snugly to fit between the dial 16 and the telephone base 18 under the dial.

The cap 19 is placed over the dial 16 by first tilting it until the lug 33 is under one edge of the dial 16 and then covering the dial and the finger stop 17 with the cap, the dial and finger stop fitting into the cavities 23 and 25 and the recess 27. The shackle 34 of lock 20 is then inserted through one of the lock openings 28 or 29 around the finger stop 17 and out the other lock opening. In this manner, the dial may be quickly and easily covered to prevent dialing. It is apparent that the cap may just as easily be removed when desired.

The modification of the invention illustrated in Figs. 8 to 16, inclusive, is characterized by constructing the locking cap in the form of a small, compact segmental locking cap 35 which is adapted to fit over only a segment or chord of the circular disc or dial 16 of telephone 15.

Locking cap 35 has a front plate 36 and a back plate 37 and preferably both plates are made of metal. Front plate 36 contains a rotary lock 38 with a lever or latch 39 mounted at the rear of the plate in a relatively long cavity or recess 40. The latch 39 is partially rotatable by a key 41 which is removably insertable in the lock 38.

Back plate 37 contains a hole 42 to receive the end of the rotary lock 38 of the front plate 36. Fixed to the front of the back plate 37 is a sleeve 43 and slidably mounted in the sleeve 43 is a bolt or locking slide 44. Slide 44 has fixed to one end a U-shaped guide 45 which slidably fits around two sides of the sleeve 43 on the outside of the sleeve. A spring seating recess 46 (see Fig. 16) is provided in the sleeve 43 at the end of the sleeve adjacent the rotary lock hole 42 in the back plate. Mounted partly in the recess 46 and partly extending from the sleeve and abutting the guide 45 is a coil spring 47. The free end of the slide 44 has an enlarged portion 48 to hold this assembly together, i. e. to hold the coil spring 47 in place.

The locking slide 44 also has a bayonet prong 49 at its free end which is offset and extends through an opening 50 in the back plate. Front plate 36 is provided with a recess 51 along its straight edge 52 to fit around the center portion 53 of the telephone dial 16 and back plate 37 has a similar recess 54.

Figures 9, 10, 11, 12, 13:
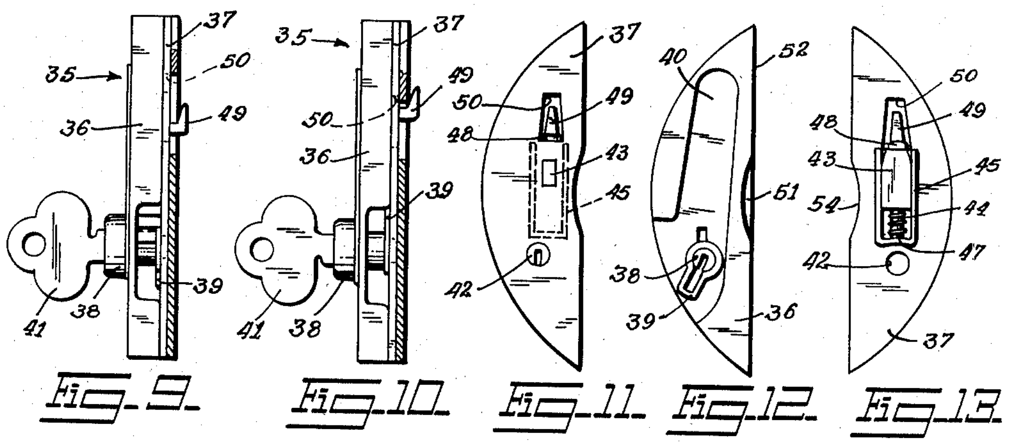
Fig. 9 is a side view of the locking cap shown in Fig. 8 and a fragmentary sectional view of the telephone dial, the locking cap being shown in unlocked position.
Fig. 10 is a view similar to Fig. 9 but showing the locked position.
Fig. 11 is a rear view of the back plate of the locking cap shown in Figs. 8 to 10, inclusive.
Fig. 12 is a rear view of the front plate of the locking device shown in Figs. 8 to 10, inclusive.
Fig. 13 is a front view of the front plate shown in Fig. 11.
Figure 14:
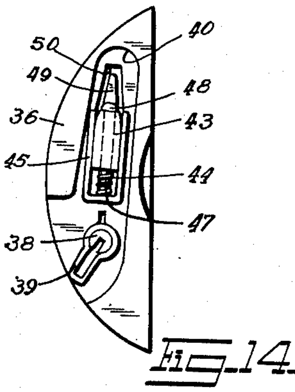
Fig. 14 is a view similar to Fig. 12 but showing the locking parts in unlocked position.
Figure 15:
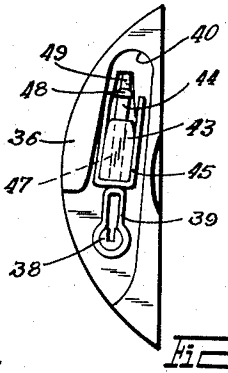
Fig. 15 is a view similar to Fig. 14 but showing the locking parts in locked position.
Figure 16:
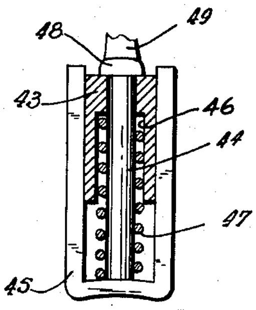
Fig. 16 is a fragmentary sectional view of the locking slide and attendant parts shown in Figs. 9, 10, 11, 13, 14 and 15.

It can be readily seen from the drawings and the foregoing description that when the key 41 is turned to the unlocked position shown in Fig. 9, the cap 35 can be placed over a telephone dial adjacent the finger stop. The bayonet prong 49 will extend through one of the dial finger openings. When the key is turned to the lock position shown in Fig. 10 (from which the key can be removed and pocketed) the bayonet prong 49 will extend under the telephone dial engaging it and locking the cap in place on it. Any attempt to use the dial when the cap is thus locked on will be futile because the cap will abut the finger stop and prevent turning of the dial.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A locking device for a rotary telephone dial having a fixed finger stop associated therewith, comprising a locking cap having a front plate and a back plate, a lock in said front plate cooperating with a latch therein, said back plate having a hole to receive one end of said lock, said back plate having an opening, a slide in said back plate provided with a bayonet prong, said prong extending through said opening, said front and back plates having recesses to fit over a telephone dial.

2. The combination of claim 1, wherein a sleeve is fixed to the front of said back plate, said slide being mounted in said sleeve.

3. The combination of claim 2, wherein a U-shaped guide is slidably fitted around said sleeve, said slide being fixed at one end thereto, and tension means in said sleeve adjacent said rotary lock.

4. The combination of claim 3, wherein the free end of said slide has an enlarged portion holding the assembly together, and said bayonet prong at its free end is offset to extend through the back plate opening.

5. The combination with an automatic telephone and its rotary dial plate, of a cap having a crescent-shaped hollow body including spaced top and bottom plates and a connecting side plate, said cap being adapted to fit over a portion of the peripheral edge of the dial plate of the telephone, a barrel type locking device mounted on the top plate including a rotary lever, a spring loaded sliding and locking bolt mounted on the bottom plate, in the path of movement of said lever, said bolt having a bayonet-shaped offset head normally projecting through one of the spaced openings in the dial plate, and key means for actuating said rotary lever whereby said bolt is adapted to be moved to bring its head underneath and into interlocking relation with the material of the dial plate around said one opening.

References Cited in the file of this patent

UNITED STATES PATENTS

| | | |
|---|---|---|
| 1,664,939 | Mortimer | Apr. 3, 1928 |
| 2,000,669 | Poliakoff | May 7, 1935 |
| 2,194,521 | Engelson | Mar. 26, 1940 |